UNITED STATES PATENT OFFICE.

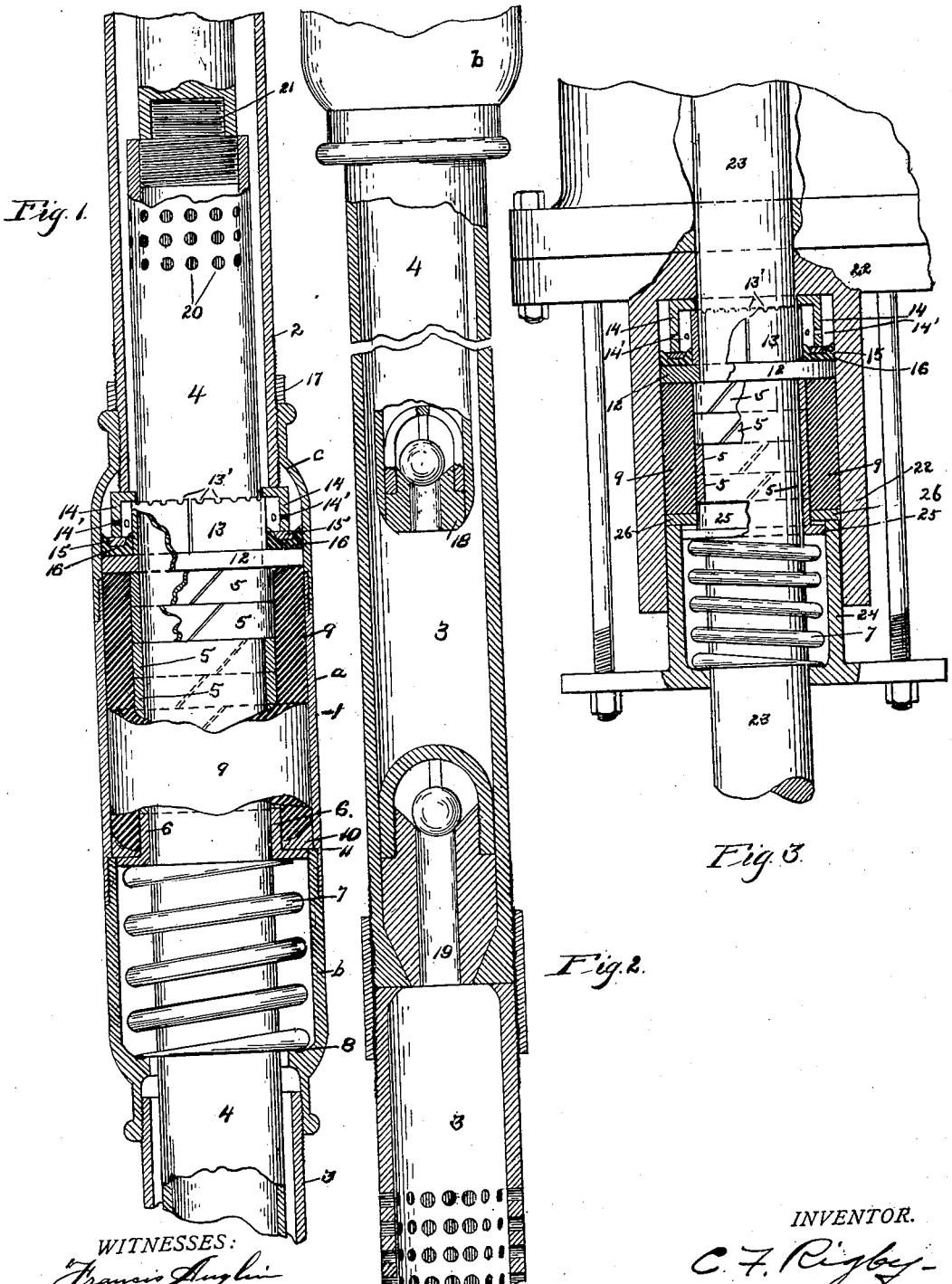

CLARK F. RIGBY, OF MANNINGTON, WEST VIRGINIA.

PISTON-PACKING.

SPECIFICATION forming part of Letters Patent No. 660,167, dated October 23, 1900.

Application filed August 8, 1899. Serial No. 726,579. (No model.)

*To all whom it may concern:*

Be it known that I, CLARK F. RIGBY, a citizen of the United States, residing at Mannington, in the county of Marion and State of West Virginia, have invented new and useful Improvements in Piston-Packing, of which the following is a specification.

This invention relates to a packing for oil, steam, and other pump-pistons and for piston-rods of steam and other engines; and the primary object thereof is to provide simple and improved means for utilizing the pressure of the confined fluid or weight of the fluid being pumped, whether steam in the engine or oil or other fluid in the pump, for automatically compressing and holding the packing to the piston or rod.

The invention consists in the novel features of construction and in the combination and assemblage of parts hereinafter fully described and claimed and illustrated by the accompanying drawings, in which—

Figure 1 is a view of a deep-well oil-pump and packing embodying my improvements shown partly in elevation and partly in section. Fig. 2 is a similar view of the lower portion of the pump. Fig. 3 illustrates the packing applied to an engine or pump-piston.

Referring to Figs. 1 and 2, 1 is the stuffing-box, having union at its upper end with well-tube 2 and at its lower end with anchor-tube 3.

4 is the hollow pump-piston, and 5 represents split metallic rings encircling the same and resting on outwardly-flanged ring 6. Spiral spring 7 embraces the piston and at its upper end bears against ring 6 and at its lower end against internal annular shoulder 8 of box 1.

Rings 5 and 6 are inclosed in a rubber packing-sleeve 9, which tightly fits box 1. At the bottom of the sleeve is inwardly-flared ring 10, which rests on shoulder 11, formed by the extremity of the lower section of box 1. Ring 10 overlaps the flange of ring 6, so that the rubber packing cannot work below the latter. At the upper end of the packing is ring 12, which covers uppermost ring 5, thus forming an abutment for the upper ends of the ring and soft packings, which maintains their extremities in the same plane. Bearing on top of ring 12 is split ring 13, and overhanging the latter and bearing thereon is the flanged overhanging sleeve 14, the latter at its lower end bearing on ring 15, embedded in the top surface of leather or other soft packing-gasket 16. This gasket rests on ring 12, and when compressed by the inward movement of tube 2 and sleeve 14 is flared radially inward and outward tightly against box 1 and split ring 13. When the desired pressure is attained, tube 2 is locked to the stuffing-box by nut 17. The pressure thus exerted compresses rubber sleeve 9, which is held at the bottom against longitudinal movement by shoulder 11, which in turn contracts rings 5 on the piston. Thus it will be seen that gasket 16 effectually prevents the passage of any oil to rubber sleeve 9 and by contracting ring 13 renders effective the initial portion of the metallic packing.

With both portions of the packing yieldingly held, the split rings by the compressed spring and the compressed soft packing by its own elasticity, there is energy constantly exerted to keep the packing tight on the piston. As it is impossible for the soft packing to come in contact with the piston, there is no danger of the latter being cut or roughened.

In order to subject the packing to the pressure of the column of oil in the tubing, I notch ring 13 at 13' and provide sleeve 14 with apertures 14', so that the oil may work past the piston into the cavity above the gasket 16, and through the latter bring its weight to bear directly on the packing. Without this the packing is effective; but I consider it an extremely-advantageous feature, as it in no wise interferes with the ordinary adjustment of the packing and renders the same more perfectly automatic.

The stuffing-box 1 is made up of a central cylindrical section $a$, having threaded union at its lower end with reduced end $b$, into which tube 3 is screwed, and at its upper end with reduced end portion $c$, which receives threaded tube 2. This form of box enables me to make direct tube-couplings, as stated, avoiding the use of bushings, glands, &c. Also by this arrangement I am enabled to bring tube 2 to bear directly on the packing for adjusting it, as before fully explained, and to lock it in the desired adjustment by nut 17. Reduced lower end *b* provides an integral abutment for spring 7, avoiding the necessity of an inserted abutment.

The lower extremity of the piston is provided with the usual check-valve 18, and anchor 3 with foot-valve 19. Oil discharges from the piston through apertures 20. The piston terminates in a suitable sucker-rod coupling 21.

For engine and pump cylinders the packing is arranged as shown in Fig. 3, wherein 22 is the stuffing-box, and 23 the piston. Rubber sleeve 9 is compressed by the gland 24, which bears on ring 26, the latter inclosing the flanged follower-ring 25. Spring 7 within the gland and encircling the rod bears against ring 25, so that inward movement of the gland compresses both the soft packing and the spring. At the inner end of the packing rings 12 and 13, sleeve 14, and gasket 15 are arranged as in Fig. 1 and operate in the same manner to utilize the cylinder-pressure for automatically compressing the soft packing against the positively-held gland and the metallic packing-rings against the spring.

By arranging the spring at the lower or outer end of the packing and subjecting its inner or upper end to pressure of the fluid, whether oil in the tubing or steam or water in the cylinder, the packing is automatically balanced and adjusted to the piston and so permanently maintained.

Having thus fully described my invention, what I claim as new, and desire to secure by Letters Patent, is—

1. The combination of a fluid-container, a stuffing-box, a piston, a succession of split metallic rings embracing the piston and adapted to contract radially thereon, soft packing closely fitting the space between said rings and the wall of the box and compressible longitudinally for the purpose of contracting the split metallic rings, one end of the soft packing being subjected to longitudinal pressure of the steam or other fluid in the container, substantially as shown and described.

2. In an improved packing, the combination with a cylinder or other fluid-container, a stuffing-box, a piston, radially-compressible metallic packing embracing the rod, longitudinally-compressible packing inclosing the metallic packing and tightly fitting the box, said longitudinally-compressible packing being exposed at one end to the pressure or weight of the fluid in the cylinder or other container, substantially as shown and described.

3. In an improved packing, the combination with a stuffing-box, and a piston, of a radially-compressible metallic packing embracing the piston, a longitudinally-compressible packing inclosing the metallic packing and tightly fitting the stuffing-box, means for positively holding one end of the outer packing against longitudinal movement, and a spring for yieldingly holding the corresponding end of the metallic packing, and means for exerting longitudinal pressure on the opposite end of the metallic and longitudinally-compressible packings by the action of a fluid, substantially as shown and described.

4. In an improved packing, the combination with a cylinder, a stuffing-box, and a piston, of radially-compressible metallic packing embracing the piston, longitudinally-compressible packing inclosing the metallic packing and tightly fitting the box, a non-yielding gland abutting against the outer end of the longitudinally-compressible packing, a spring between the gland and metallic packing for yieldingly holding the latter, the inner ends of the packing being subjected uniformly to the pressure of fluid in the cylinder, substantially as shown and described.

5. An improved piston-packing comprising a stuffing-box, a contractile metal packing embracing the piston, a soft packing inclosing the metal packing, the soft and metal packing being each positively held at one end against longitudinal movement and yieldingly held at the other end, means for longitudinally compressing the soft packing, a metallic ring 12 covering the inner ends of both packings, split ring 13 embracing the piston and bearing on ring 12, gasket 16 encircling ring 13 and bearing on ring 12, the gasket having inwardly and outwardly flaring edges on the side opposite ring 12, and flanged collar 14 confined at its inner end between the inner extremity of ring 13 and the fluid-container, and at its outer end bearing centrally on gasket 16 between its flaring edges, substantially as shown and described.

6. An improved piston-packing comprising a contractile metallic packing encircling the piston, soft packing inclosing the contractile packing, means for holding and adjusting the metal and soft packings longitudinally, gasket 16, ring 12 interposed between the gasket and said soft and metal packings, split ring 13 within the gasket, and collar 14 confined at one end between ring 13 and the fluid-container, said collar at its opposite end bearing on gasket 16, substantially as shown and described.

7. An improved piston-packing comprising a contractile metallic packing encircling the piston, soft packing inclosing the contractile packing, means for holding and adjusting the metal and soft packings longitudinally, gasket 16, ring 12 interposed between the gasket and the said soft and metal packings, split ring 13 apertured at its inner end, and the apertured collar 14 confined at its inner end between ring 13 and the fluid-container, said collar at its outer end bearing on gasket 16, substantially as shown and described.

In testimony whereof I have hereunto set my hand in presence of two subscribing witnesses.

CLARK F. RIGBY.

Witnesses:
D. E. BOWER,
C. P. FAULKNER.